United States Patent
Park et al.

(10) Patent No.: US 10,481,867 B2
(45) Date of Patent: Nov. 19, 2019

(54) DATA INPUT/OUTPUT UNIT, ELECTRONIC APPARATUS, AND CONTROL METHODS THEREOF

(71) Applicant: Samsung Electronics Co., Ltd., Gyeonggi-do (KR)

(72) Inventors: Jae-un Park, Seoul (KR); Jong-hun Lee, Seoul (KR); Ki-seok Kwon, Seoul (KR); Dong-kwan Suh, Gyeonggi-do (KR); Kang-jin Yoon, Seoul (KR); Jung-uk Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/727,093

(22) Filed: Oct. 6, 2017

(65) Prior Publication Data

US 2018/0101357 A1 Apr. 12, 2018

(30) Foreign Application Priority Data

Oct. 7, 2016 (KR) .................. 10-2016-0130051

(51) Int. Cl.
*G06F 13/16* (2006.01)
*G06F 5/06* (2006.01)
*G06F 9/38* (2018.01)
*G06F 9/52* (2006.01)

(52) U.S. Cl.
CPC ............ *G06F 5/065* (2013.01); *G06F 9/3855* (2013.01); *G06F 9/52* (2013.01); *G06F 13/1673* (2013.01)

(58) Field of Classification Search
CPC .... G06F 13/385; G06F 13/28; G06F 13/1673; G06F 3/0656; H04L 49/90
See application file for complete search history.

(56) References Cited

U.S. PATENT DOCUMENTS

| 5,878,245 | A | * | 3/1999 | Johnson | .............. G06F 9/30043 |
| | | | | | 711/131 |
| 5,878,280 | A | | 3/1999 | Lucht | |
| 5,920,724 | A | * | 7/1999 | Chang | ................... G06F 8/4452 |
| | | | | | 712/241 |
| 6,173,378 | B1 | | 1/2001 | Rozario et al. | |
| 6,738,837 | B1 | | 5/2004 | Wyland | |

(Continued)

FOREIGN PATENT DOCUMENTS

JP      5296041     9/2013
KR 10-2013-0045360 5/2013

OTHER PUBLICATIONS

International Search Report dated Jan. 12, 2018 issued in counterpart application No. PCT/KR2017/010988, 10 pages.

(Continued)

*Primary Examiner* — Brian T Misiura
(74) *Attorney, Agent, or Firm* — The Farrell Law Firm, P.C.

(57) ABSTRACT

A data input/output unit is provided. The data input/output unit which is connected to a processor, and receives and outputs data in sequence based on a first schedule includes a first input first output (FIFO) memory connected to an external unit and the processor; and a reordering buffer connected to one side of the FIFO memory, and store data outputted from, or inputted to, the FIFO memory in a plurality of buffer regions in sequence, and output data stored in one of the plurality of buffer regions based on a control signal provided from the processor.

19 Claims, 15 Drawing Sheets

(56) References Cited

U.S. PATENT DOCUMENTS

| | | | |
|---|---|---|---|
| 7,096,345 B1* | 8/2006 | Chen | G06F 9/3838 |
| | | | 712/217 |
| 7,159,078 B2 | 1/2007 | Lee et al. | |
| 7,331,045 B2* | 2/2008 | Martin | G06F 8/4452 |
| | | | 717/159 |
| 7,791,611 B1 | 9/2010 | Holmqvist et al. | |
| 7,856,629 B2* | 12/2010 | Michimoto | G06F 8/4452 |
| | | | 717/151 |
| 8,451,147 B2 | 5/2013 | Mazumdar et al. | |
| 8,832,324 B1* | 9/2014 | Hodges | G06F 13/1642 |
| | | | 710/5 |
| 9,170,792 B2 | 10/2015 | Park et al. | |
| 9,239,712 B2 | 1/2016 | Rong et al. | |
| 9,817,773 B2* | 11/2017 | Lim | G06F 13/4022 |
| 9,983,875 B2* | 5/2018 | Chadha | G06F 9/30043 |
| 2003/0217224 A1 | 11/2003 | Watts | |
| 2006/0155940 A1 | 7/2006 | Au et al. | |
| 2012/0117360 A1* | 5/2012 | Sankaran | G06F 9/30018 |
| | | | 712/226 |
| 2012/0235839 A1 | 9/2012 | Mazumdar et al. | |
| 2013/0212319 A1 | 8/2013 | Hida et al. | |
| 2014/0164743 A1 | 6/2014 | Giroux et al. | |
| 2015/0186267 A1 | 7/2015 | Chun et al. | |

OTHER PUBLICATIONS

European Search Report dated May 23, 2019 issued in counterpart application No. 17858731.7-1218, 7 pages.

\* cited by examiner

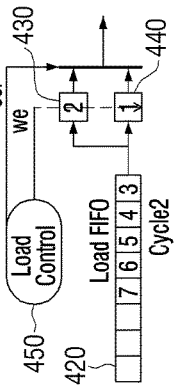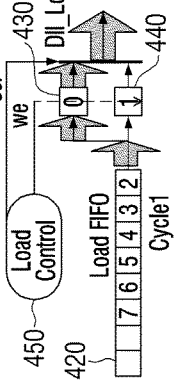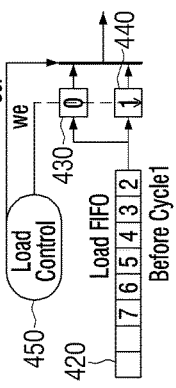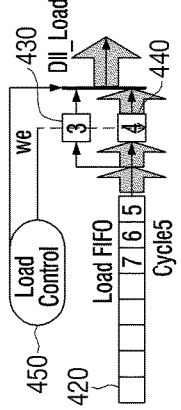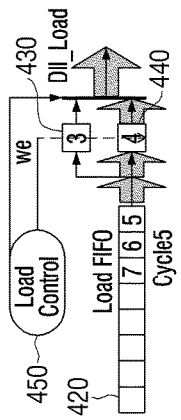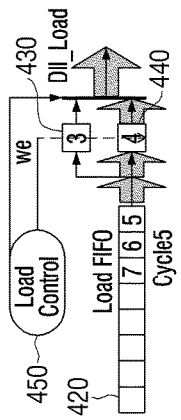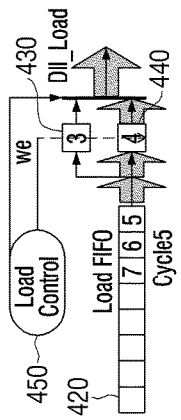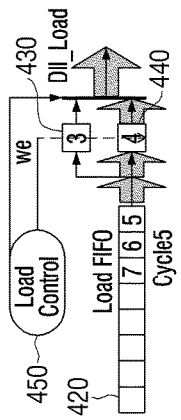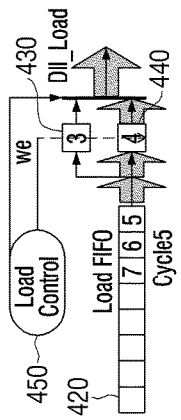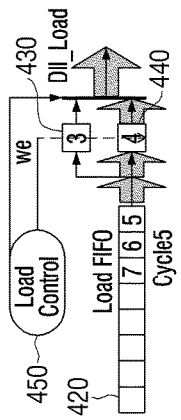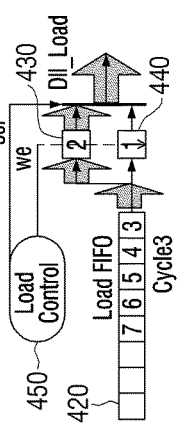

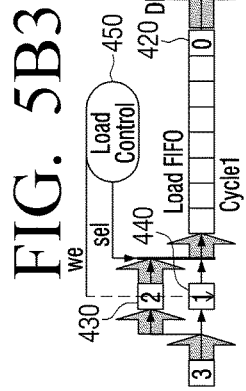
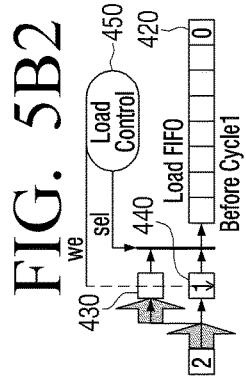
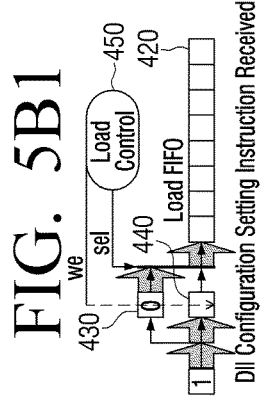
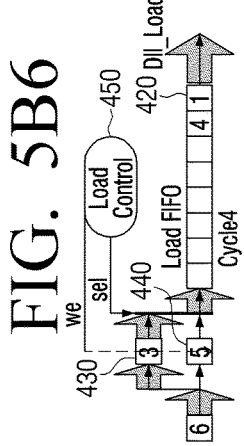
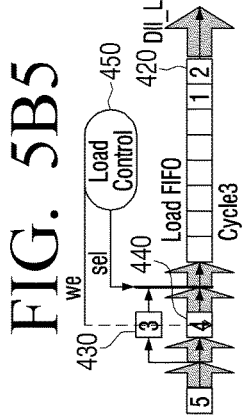
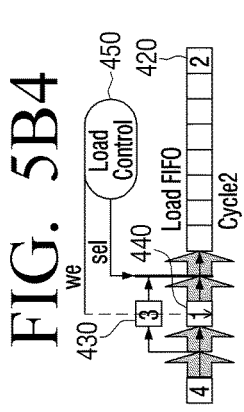
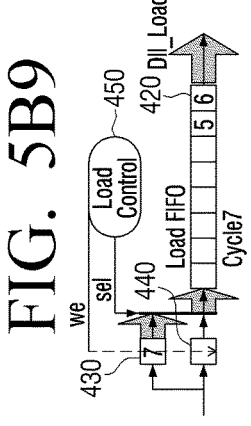
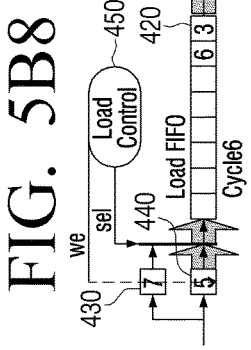
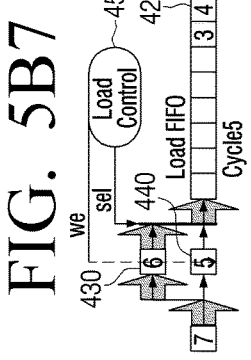
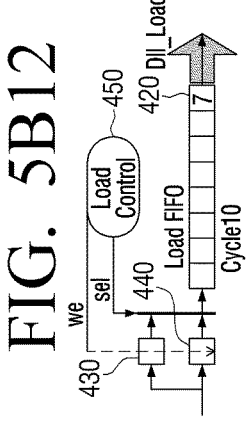
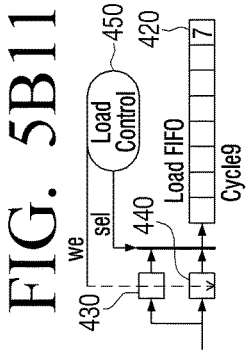
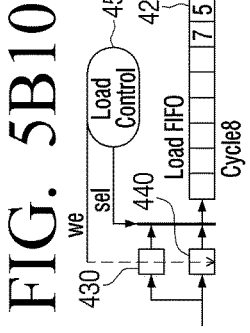

FIG. 6

| Cycle | Iteration | | | | | |
|---|---|---|---|---|---|---|
| 1 | 0 | dii_store(0) | | | | prolog |
| 2 | | add | | | | |
| 3 | 1 | shift | dii_store(2) | | | |
| 4 | | dii_store(1) | add | | | |
| 5 | 2 | | shift | dii_store(4) | | |
| 6 | | sub | dii_store(3) | add | | kernel |
| 7 | 3 | | | shift | dii_store(6) | |
| 8 | | | sub | dii_store(5) | add | |
| 9 | 4 | | | | shift | |
| 10 | | | | sub | dii_store(7) | epilog |
| 11 | 5 | | | | | |
| 12 | | | | | sub | |

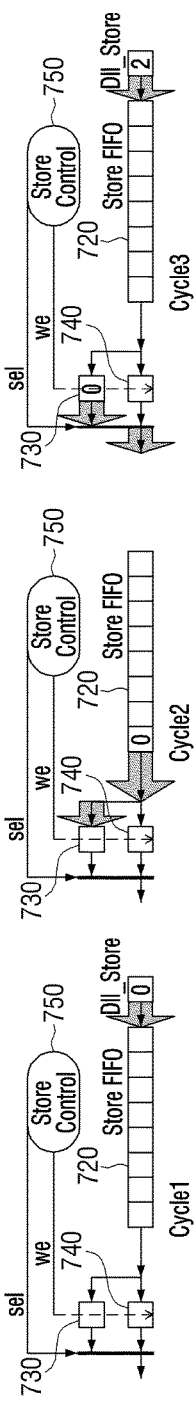
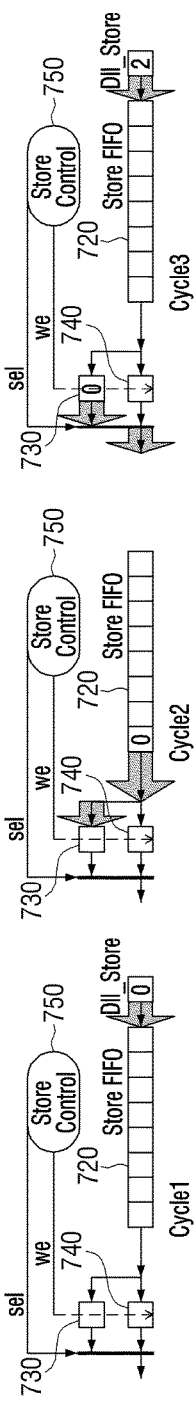
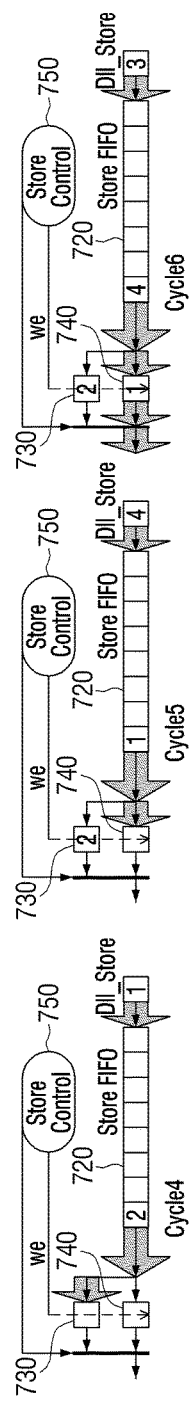
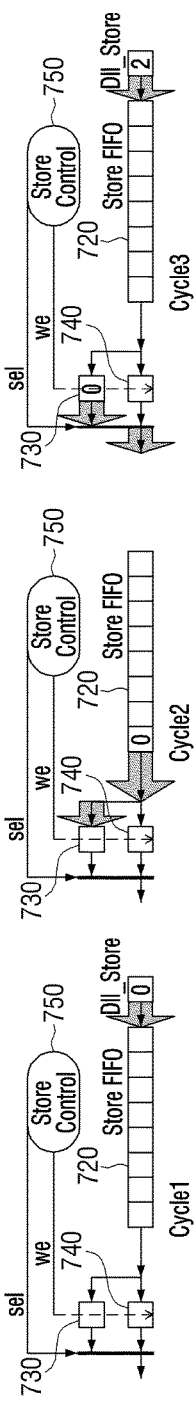
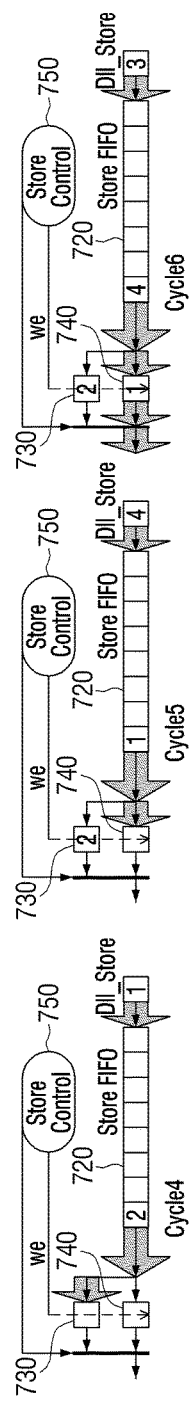
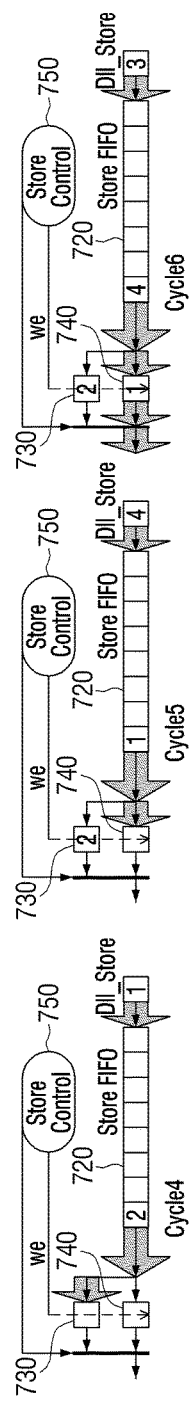
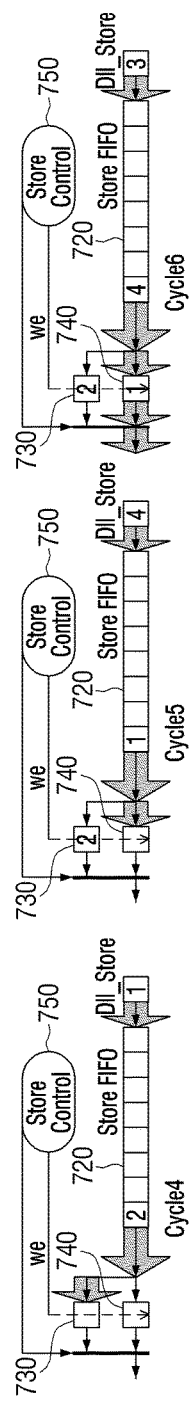
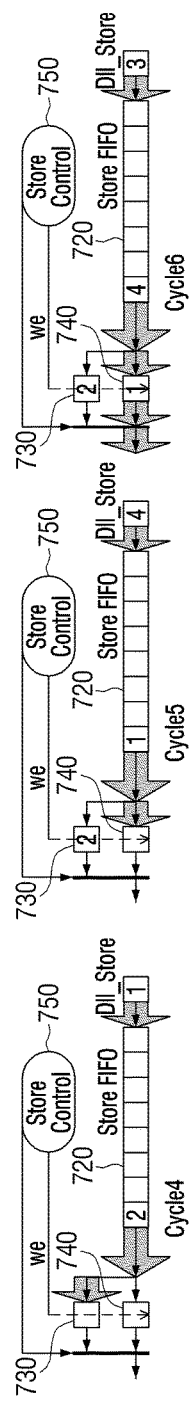
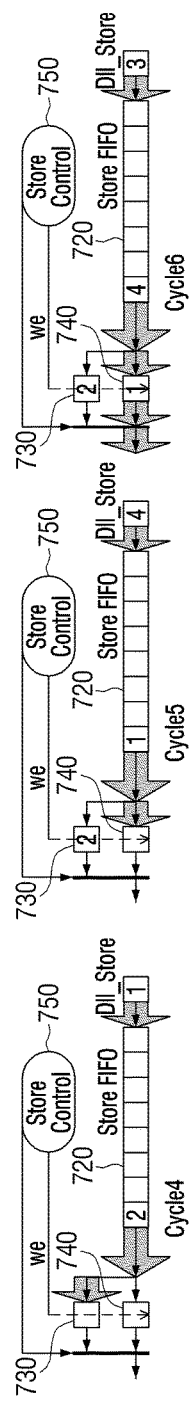
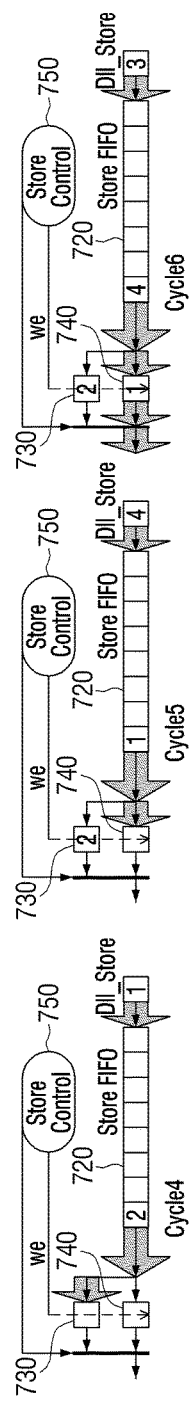
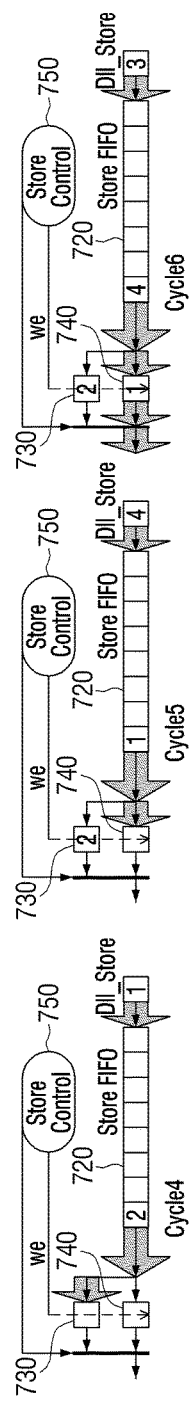
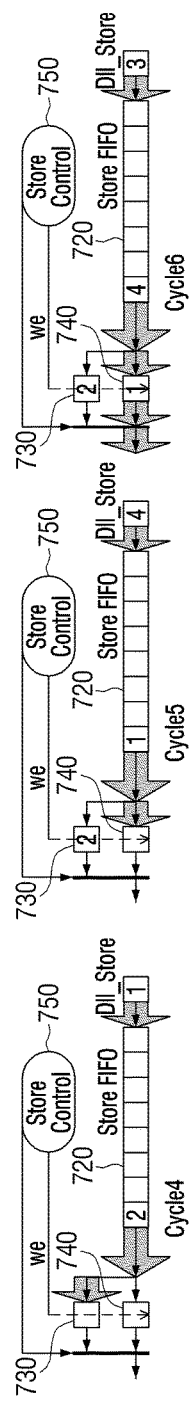

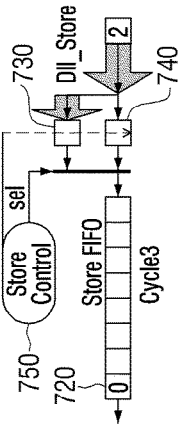
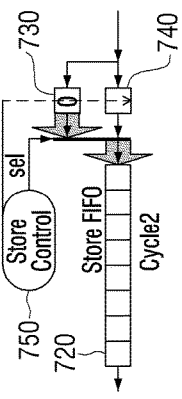
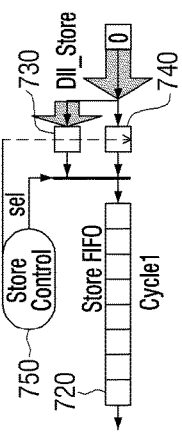
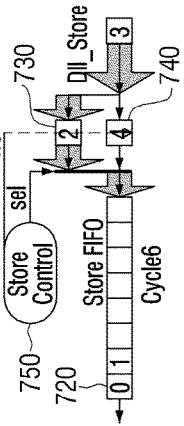
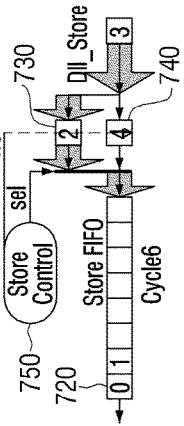
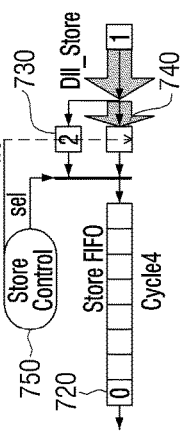
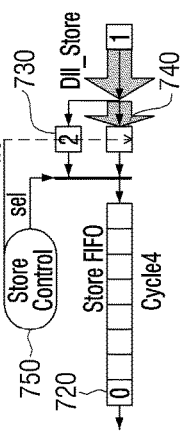
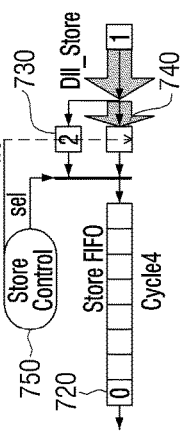
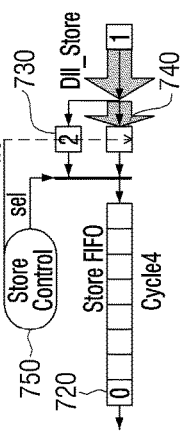
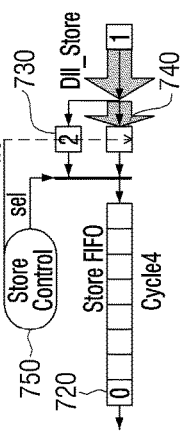
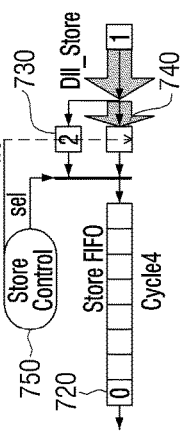
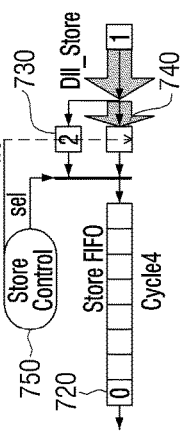

DATA INPUT/OUTPUT UNIT, ELECTRONIC APPARATUS, AND CONTROL METHODS THEREOF

PRIORITY

This application claims priority under 35 U.S.C. § 119(a) to a Korean Patent Application filed on Oct. 7, 2016 in the Korean Intellectual Property Office and assigned Serial No. 10-2016-0130051, the entire contents of which are incorporated herein by reference.

BACKGROUND

1. Field of the Disclosure

The present disclosure relates generally to a data input/output unit, an electronic apparatus, and control methods thereof, and more particularly, to a data input/output unit which is provided with a first input first output (FIFO) memory to allow data to be inputted/outputted therethrough, an electronic apparatus, and control methods thereof.

2. Description of the Related Art

Data transmission and reception between a digital signal processor (DSP) core and an external memory or external hardware are normally performed through a protocol of a system bus. Data read/write using a bus protocol may require many cycles according to the situation of the bus. This may cause a bottle neck in the performance of a system including a DSP Core. As a result, there is a need to reduce data transmission cycles to enhance the performance of a system.

To reduce data transmission cycles, a method of using a FIFO memory is used. If a FIFO memory is able to store data, the FIFO memory continuously requests and stores data, and the DSP core can immediately read data when there is data in the FIFO memory. That is, since a FIFO memory stores data before the DSP core requires the data, data transmission cycles may be reduced.

In addition, to enhance performance, parallelization of input/output commands may be used through loop processing of data input/output commands and software pipelining.

However, if a DSP core is required to access a FIFO memory many times to perform loop processing, the order of accessing should necessarily be followed. Since a typical memory outputs data using storage addresses of the data, the order is not important. However, since a FIFO memory outputs data in sequence without using storage addresses of the data, the order of accessing is important.

Specifically, there may be many operations for reading or removing data (e.g., pops) from a FIFO loaded with data in a loop or many operations for writing data (e.g., pushes) to a FIFO. However, if software pipelining is performed without considering the dependency between a pop and a push, the number of commands that may be processed in parallel during one cycle increases and thus performance may be greatly enhanced, but the order of accessing the FIFO memory may be reversed. If software pipelining is performed by considering the dependency between a pop and a push, the number of commands that may be processed in parallel during one cycle is not sufficient to obtain optimum performance. Accordingly, there is a need for a method for enhancing parallel processing efficiency while using a FIFO memory.

SUMMARY

According to an aspect of the present disclosure, there is provided a data input/output unit. A data input/output unit connected to a processor, and receives and outputs data in sequence based on a first schedule, the data input/output unit includes a first input first output (FIFO) memory connected to an external unit and the processor; and a reordering buffer connected to one side of the FIFO memory, and store data outputted from, or inputted to, the FIFO memory in a plurality of buffer regions in sequence, and output data stored in one of the plurality of buffer regions based on a control signal provided from the processor.

According to another aspect of the present disclosure, there is provided an electronic apparatus. The electronic apparatus includes a data input/output unit configured to receive and output data in sequence based on a first schedule; and a processor configured to process data based on a second schedule in which cycles of a kernel of the first schedule are reduced, and wherein the data input/output unit includes a first input first output (FIFO) memory connected to an external unit and the processor; and a reordering buffer connected to one side of the FIFO memory, and store data outputted from, or inputted to, the FIFO memory in a plurality of buffer regions in sequence, and output data stored in one of the plurality of buffer regions based on a control signal provided from the processor.

According to another aspect of the present disclosure, there is provided a method of controlling a data input/output unit, wherein the data input/output unit which is connected to a processor, and receives and outputs data in sequence based on a first schedule, wherein the data input/output unit includes a first input first output (FIFO) memory connected to an external unit and the processor, and a reordering buffer connected to one side of the FIFO memory, the method including storing data outputted from, or inputted to, the FIFO memory in a plurality of buffer regions of the reordering buffer in sequence; and outputting data stored in one of the plurality of buffer regions based on a control signal provided from the processor.

According to another aspect of the present disclosure, there is provided a method of controlling an electronic apparatus, wherein the electronic apparatus includes a data input/output unit configured to receive and output data in sequence based on a first schedule, and including a first input first output (FIFO) memory connected to an external unit and a processor, and a reordering buffer connected to one side of the FIFO memory; and a processor configured to process data based on a second schedule in which cycles of a kernel of the first schedule are reduced, the control method including storing data which is outputted from, or inputted to, the FIFO memory in a plurality of buffer regions of the reordering buffer in sequence; and outputting data stored in one of the plurality of buffer regions based on a control signal provided from the processor.

BRIEF DESCRIPTION OF THE DRAWINGS

The above and/or other aspects, features, and advantages of the present disclosure will be more apparent from the following description, taken in conjunction with the accompanying drawings, in which:

FIGS. 4A, 4B1, 4B2, 4B3, 4B4, 4B5, 4B6, 4B7, 4B8, 4B9, 4B10, and 4B11 are illustrations of a first reordering buffer according to an embodiment of the present disclosure;

FIGS. 5A, 5B1, 5B2, 5B3, 5B4, 5B5, 5B6, 5B7, 5B8, 5B9, 5B10, 5B11, and 5B12 are illustrations of a first reordering buffer according to an embodiment of the present disclosure;

FIG. 6 is illustration of a schedule according to an embodiment of the present disclosure;

FIGS. 7A, 7B1, 7B2, 7B3, 7B4, 7B5, 7B6, 7B7, 7B8, 7B9, 7B10, 7B11, and 7B12 are illustrations of a second reordering buffer according to an embodiment of the present disclosure;

FIGS. 8A, 8B1, 8B2, 8B3, 8B4, 8B5, 8B6, 8B7, 8B8, 8B9, 8B10, 8B11, and 8B12 are illustrations of a second reordering buffer according to an embodiment of the present disclosure;

FIG. 9 is a flowchart of a method of generating a control signal according to an embodiment of the present disclosure; and FIG. 10 is a flowchart of a control method of a data input/output unit according to an embodiment of the present disclosure.

DETAILED DESCRIPTION OF EMBODIMENTS OF THE PRESENT DISCLOSURE

Figure 1:
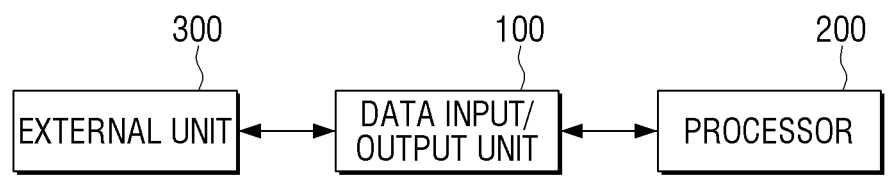
FIG. 1 is a block diagram of a data input/output unit, a processor, and an external unit according to an embodiment of the present disclosure.

Embodiments of the present disclosure are described below with reference to the accompanying drawings. However, various embodiments of the present disclosure are not intended to limit the present disclosure but are intended to be construed as including a modification, an equivalent and/or an alternative of embodiments of the present disclosure. In the descriptions of the drawings, similar reference numerals are used for similar elements.

It will be understood that when an element (for example, a first element) is "(operatively or communicatively) coupled with/to" or "connected to" another element (for example, a second element), the element may be directly coupled with/to another element, and there may be an intervening element (for example, a third element) between the element and the other element. To the contrary, it will be understood that when an element (for example, a first element) is "directly coupled with/to" or "directly connected to" another element (for example, a second element), there is no intervening element (for example, a third element) between the element and the other element.

The terms used to describe various embodiments of the present disclosure are for the purpose of describing certain embodiments but are not intended to limit the present disclosure. As used herein, the singular forms are intended to include the plural forms as well, unless the context clearly indicates otherwise. All of the terms used herein are intended to have the same meanings as those generally understood by an ordinarily skilled person in the related art unless they are defined otherwise. The terms defined in a generally used dictionary are intended to be interpreted as having the same meanings as the contextual meanings of the relevant technology and are not intended to be interpreted as having ideal or exaggerated meanings unless they are clearly defined in the various embodiments. According to the situation, even the terms defined in the embodiments are not intended to be interpreted as excluding the embodiments of the present disclosure.

FIG. 1 is a block diagram of a data input/output unit or device 100, a processor 200, and an external unit or device 300 according to an embodiment of the present disclosure.

The data input/output unit 100 may be implemented in the form of a direct interface intrinsic (DII) device, may be directly connected to the processor 200 and the external unit 300, and may provide data outputted from the external unit 300 to the processor 200 or provide data outputted from the processor 200 to the external unit 300.

Herein, the DII device is a device which is designed to directly connect an output from the processor 200 and an input to the external unit 300 or an input to the processor 200 and an output from the external unit 300.

When the data input/out unit 100 is used to transmit data between the processor 200 and the external unit 300, a data transmission speed can be enhanced in comparison to a case where a bus is used.

The data input/output unit 100 may receive and output data in sequence based on a first schedule. Herein, the first schedule may be a schedule which does not reduce cycles of a kernel.

A schedule may be data which is processed in the processor 200 and outputted after a plurality of commands are compiled by an external compiler according to a plurality of cycles. That is, a schedule may be data which is obtained by converting a program written in a high-level language into a language that may be directly understood by the processor 200.

The data input/output unit 100 may temporarily store data which is inputted from the processor 200 or the external unit 300, and may provide some of the stored data to the external unit 300 or the processor 200 according to a cycle. In this case, the data input/output unit 100 may change an order of inputted data and an order of outputted data.

The processor 200 may be a processor like a DSP core. However, the present disclosure is not limited thereto, and the processor 200 may be any other type of processor.

The processor 200 may process data based on a second schedule which reduces cycles of a kernel of a first schedule. Herein, the second schedule may be a schedule which reduces the cycles of the kernel by changing execution cycles of input/output commands in the first schedule. The second schedule is described below in greater detail with the first schedule.

The processor 200 may be connected to the data input/output unit 100 to receive data from the data input/output unit 100 or output data to the data input/output unit 100.

The processor 200 may include a plurality of function units or devices. The plurality of function units included in the processor 200 may be different types of function units. For example, a first function unit in the processor 200 may be able to perform only an addition operation, but a second function unit may be able to perform not only the addition operation but also a multiplication operation. However, the present disclosure is not limited thereto. The plurality of function units included in the processor 200 may be the same function unit.

The external unit 300 may be an external hardware configuration like an external memory. Herein, the external hardware configuration may refer to a hardware configuration which is different from the data input/output unit 100 and the processor 200 in the same device.

The external unit 300 may be connected to the data input/output unit 100 to receive data from the data input/output unit 100 or output data to the data input/output unit 100.

For example, the external unit 300 may provide data to the data input/output unit 100 based on the first schedule. Alternatively, the external unit 300 may receive data from the data input/output unit 100 to correspond to the first schedule.

As described above, the data input/output unit 100 directly controls data transmission between the processor 200 and the external unit 300 such that a transmission speed of data between the processor 200 and the external unit 300 and a processing speed of commands according to the schedule of the processor may be enhanced.

In the above-described example, the data input/output unit 100, the processor 200, and the external unit 300 may be configured in a single electronic apparatus.

An external compiler may generate a schedule and provide the schedule to the electronic apparatus. In this case, the external compiler may generate the schedule in consideration of an operation of the data input/output unit 100. This is described below in greater detail after the operation of the data input/output unit 100 is described.

Herein, the external compiler may be a device which receives the first schedule and generates the second schedule. Alternatively, the external compiler may be a device which directly generates the second schedule by converting a program written in a high-level language into a language that may be directly understood by the processor 200.

Hereinafter, the operation of the data input/output unit 100 is described.

Figure 2:
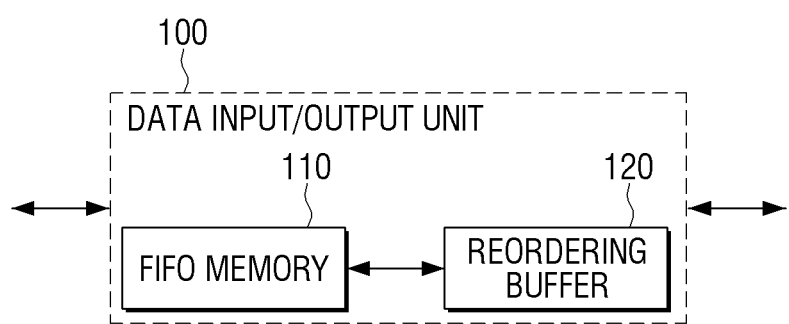
FIG. 2 is a block diagram of the data input/output unit of FIG. 1 according to an embodiment of the present disclosure.

FIG. 2 is a block diagram showing a configuration of the data input/output unit 100 according to an embodiment of the present disclosure.

Referring to FIG. 2, the data input/output unit 100 includes a FIFO memory 110 and a reordering buffer 120.

The FIFO memory 110 may store input/output data between the external unit 300 and the processor 200 in sequence.

Herein, the FIFO memory 110 refers to a memory which processes a plurality of signals in the order of arrival without giving priority of processing when the plurality of signals are in the queue to be processed. For example, the FIFO memory 110 may store data in the order of input and may output the first stored data first.

The FIFO memory 110 may store a storage location and an output location of data based on a write pointer and a read pointer.

The FIFO memory 110 may include a first FIFO memory to provide data inputted from the external unit 300 to the processor 200, and a second FIFO memory to provide data outputted from the processor 200 to the external unit 300. Herein, the first FIFO memory and the second FIFO memory may be referred to as a load FIFO memory and a store FIFO memory, respectively.

The first FIFO memory may request data from the external unit 300 and store the data if there is storage space to store the data, and may output data in response to a load command being received. Herein, the load command may be a command to request data.

The second FIFO memory may transmit stored data in response to data being stored in the second FIFO memory and the external unit 300 being able to receive data. In addition, the second FIFO memory may receive and store data in response to there being storage space and a store command being received. Herein, the store command may be a command to store data.

The reordering buffer 120 may be connected to one side of the FIFO memory 110, and may store data which is outputted from the FIFO memory 110 or inputted to the FIFO memory 110 in a plurality of buffer regions in sequence and may output data stored in one of the plurality of buffer regions based on a control signal provided from the processor 200.

The reordering buffer 120 may include a first reordering buffer connected to one side of the first FIFO memory, and a second reordering buffer connected to one side of the second FIFO memory.

The first reordering buffer may be connected to an output side of the first FIFO memory and an input side of the processor 200, and may store data outputted from the first FIFO memory in sequence in a plurality of first buffer regions in sequence, and may output data stored in one of the plurality of first buffer regions based on a control signal and provide the data to the processor 200.

Alternatively, the first reordering buffer may be connected to an output side of the external unit 300 and an input side of the first FIFO memory, and may store data outputted from the external unit 300 in the plurality of first buffer regions in sequence, and may output data stored in one of the plurality of first buffer regions based on a control signal and provide the data to the first FIFO memory.

In this case, in response to a load command of the processor 200 being received, the first FIFO memory may output data stored in the first FIFO memory in sequence and provide the data to the processor 200.

The second FIFO memory may store data outputted from the processor 200 in sequence, and may output the stored data in sequence and provide the data to the second reordering buffer. The second reordering buffer may be connected to an output side of the second FIFO memory and an input side of the external unit 300, and may store data outputted from the second FIFO memory in sequence in a plurality of second buffer regions in sequence, and may output data stored in one of the plurality of second buffer regions based on a control signal and provide the data to the external unit 300.

Alternatively, the second reordering buffer may be connected to an output side of the processor 200 and an input side of the second FIFO memory, and may store data outputted from the processor 200 in the plurality of second buffer regions in sequence, and may output data stored in one of the plurality of second buffer regions based on a control signal and provide the data to the second FIFO memory.

The data input/output unit 100 may transmit a stall command to stall data processing of the processor 200 to the processor 200 in response to a load command of the processor 200 being received in a state where the first FIFO memory is empty or in response to a store command of the processor 200 being received in a state where there is no storage space in the second FIFO memory.

The control signal may be a signal which designates a buffer region in which data required to be outputted is stored from among the plurality of buffer regions based on the second schedule. That is, the reordering buffer 120 may change the order of inputted data based on the control signal provided by the processor 200 and output the data.

Herein, the second schedule may be a schedule which has the data input/output order of input/output commands changed by reducing the cycles of the kernel included in the first schedule based on the number of the plurality of buffer regions.

Hereinafter, the reduction of cycles accompanied by the use of the reordering buffer 120 is described.

Figure 3A:
FIGS. 3A and 3B are illustrations of a schedule according to an embodiment of the present disclosure.
Figure 3B:
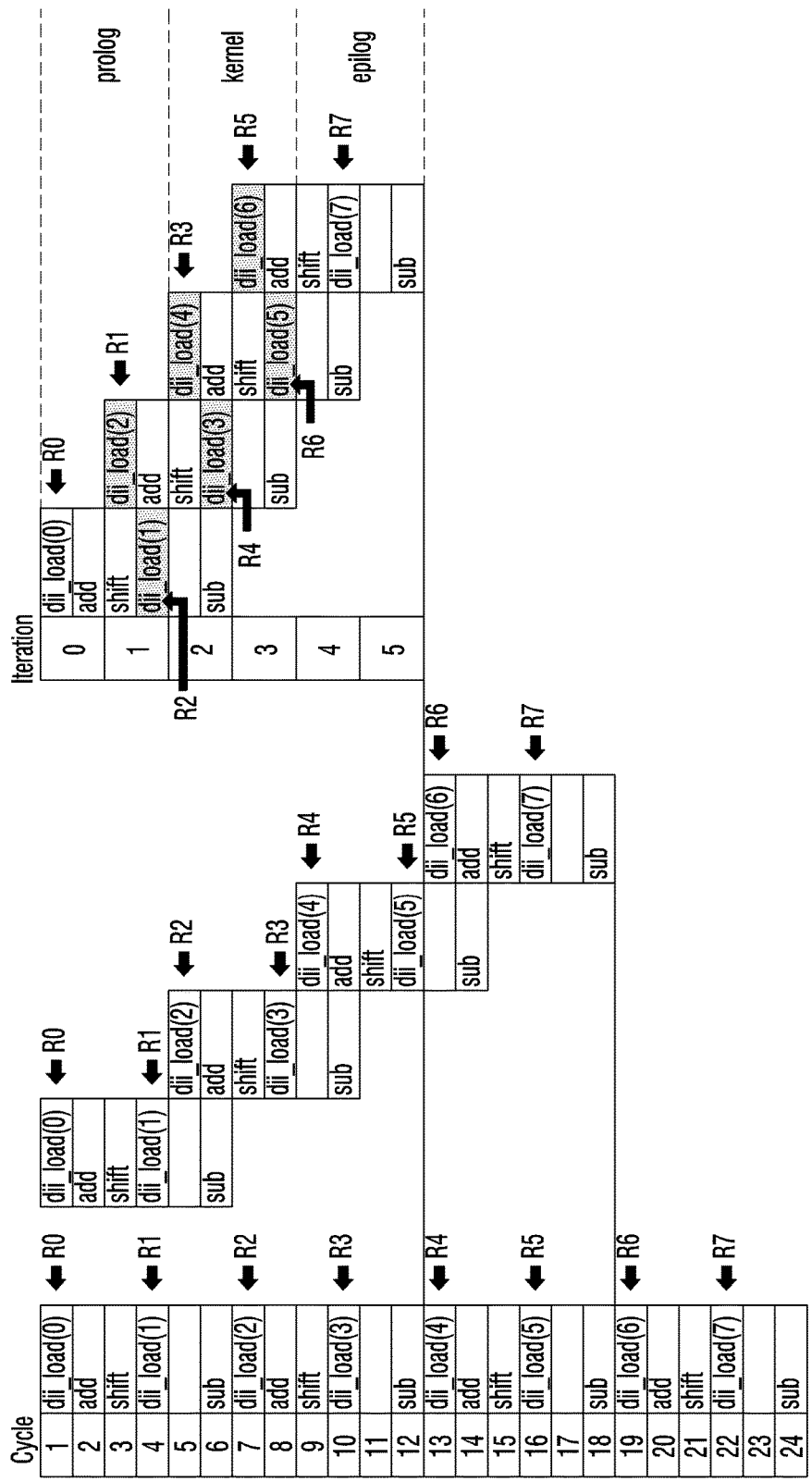
Figure 4A:
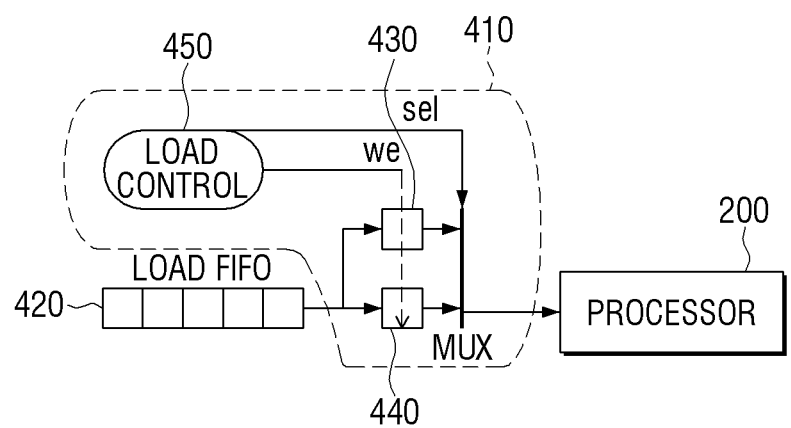
Figure 5A:
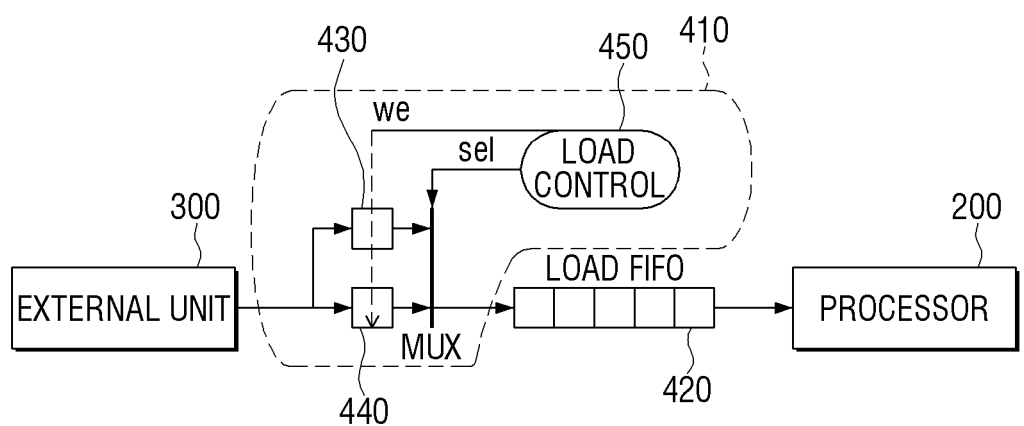
Figure 7A:
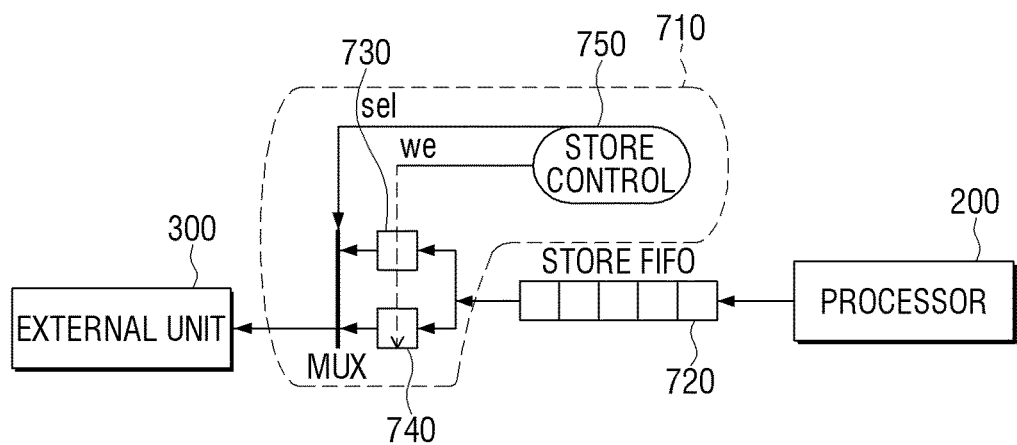
Figure 8A:
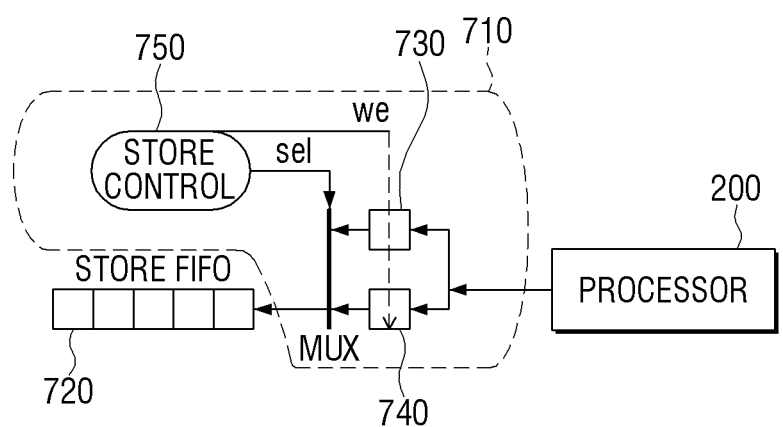

FIGS. 3A and 3B are illustrations of a schedule according to an embodiment of the present disclosure.

Referring to FIGS. 3A and 3B, the FIFO memory may store data in the order of R0, R1, R2, R3, . . . as shown in FIG. 3A, and output the data in the same order.

The external compiler may generate a schedule as shown in FIG. 3B.

The left view of FIG. 3B illustrates an example of a loop of dii_load, add, shift, dii_load, and sub commands. Herein, dii_load may be a load command regarding the FIFO memory, and the FIFO memory may output data in sequence based on a read pointer in response to a load command being inputted.

Parentheses and numbers therein after dii_load of FIG. 3B indicate an input order of input data to be inputted from the FIFO memory. In practice, only the load command may be inputted to the FIFO memory without the parentheses and the numbers therein.

That is, since dii_load is a load command for the FIFO memory, dii_load may not include address information. Accordingly, when the FIFO memory is used, a cycle necessary for generating address information may be saved in comparison to a case where a data address should be designated like a bus.

When parallel processing is possible in the processor 200, the external compiler may generate a schedule as shown in the middle view of FIG. 3B. That is, a schedule may be generated such that each loop is processed in parallel, but dii_load (2) is not processed in a previous cycle before dii_load (1) in consideration of the characteristic of the FIFO memory.

Twenty-four (24) cycles in total in the case where parallel processing is not used can be reduced to twelve (12) cycles by using parallel processing. That is, time required to execute may be reduced in the processor 200.

If a schedule is generated such that dii_load (2) is executed in the third cycle and dii_load (1) is executed in the fourth cycle as shown in the right view of FIG. 3B, the FIFO memory may output R1 in dii_load (2) which requires data of R2, and may output R2 in dii_load (1) which requires data of R1. That is, as the FIFO memory outputs data in the input order, an error may occur in data to be inputted to the processor 200.

In this case, the reordering buffer 120 may be connected to one side of the FIFO memory to adjust the order of data to be inputted to the processor 200.

That is, in the case of the middle view of FIG. 3B where the reordering buffer 120 is not used, 24 cycles in total are required. However, the cycles may be reduced to 12 cycles by using the reordering buffer 120 as shown in the right view of FIG. 3B.

In the above-described example, the schedule in the case where the reordering buffer 120 is not used as shown in the middle view of FIG. 3B is referred to as the first schedule, and the schedule in the case where the reordering buffer 120 is used as shown in the right view of FIG. 3B is referred to as the second schedule.

The external compiler may generate the second schedule by reducing the kernel of the first schedule. Herein, the kernel is a part in which all commands of one loop can be executed during each iteration. In the case of FIG. 3B, the kernel is a part in which five commands of dii_load, add, shift, dii_load, and sub are executed during one iteration. A prologue is a previous part of the kernel and an epilogue is a next part of the kernel.

The external complier may perform compiling so as to generate a kernel according to a related-art compiling rule. In addition, the external compiler may generate a schedule which has cycles reduced to a minimum number of cycles in consideration of the reordering buffer 120. That is, the second schedule may be a schedule which has the data input/output order of input/output commands changed by reducing the cycles of the kernel included in the first schedule based on the number of plurality of buffer regions. However, a detailed method of this is not described since it departs from the scope of the present disclosure.

Hereinafter, the operation of the reordering buffer 120 is described in greater detail with reference to the accompanying drawings.

FIGS. 4A, 4B1, 4B2, 4B3, 4B4, 4B5, 4B6, 4B7, 4B8, 4B9, 4B10, and 4B11 are illustrations of an operation of a first reordering buffer 410 according to an embodiment of the present disclosure. For convenience of explanation, it is assumed that the first reordering buffer 410 is operated according to the second schedule as shown in the right view of FIG. 3B Referring to FIGS. 4A, 4B1, 4B2, 4B3, 4B4, 4B5, 4B6, 4B7, 4B8, 4B9, 4B10, and 4B11, the first reordering buffer 410 may be connected to an output side of a first FIFO memory 420 and the input side of the processor 200, and may store data outputted from the first FIFO memory 420 in sequence in a plurality of first buffer regions 430 and 440 in sequence, and may output data stored in one of the plurality of first buffer regions 430 and 440 based on a control signal and provide the data to the processor 200.

Herein, the control signal may be a signal which designates a buffer region in which data required to be outputted is stored from among the plurality of first buffer regions 430 and 440 based on the second schedule.

The first reordering buffer 410 may include a load control 450. Prior to starting iterations of loops in the second schedule, the load control 450 may receive, from the processor 200, DII setting information regarding the number of dii_load commands to be processed in a prolog and a processing order thereof, the number of dii_load commands to be processed in one iteration of a kernel and a processing order thereof, and the number of dii_load commands to be processed in an epilog and a processing order thereof. That is, the load control 450 may receive DII setting information from the processor 200 before the first cycle. In the following description, the DII setting information will be referred to as a control signal.

The load control 450 may generate a write enable (We) signal and a selection (Sel) signal and control the other configurations in the first reordering buffer 410. The We signal is a signal indicating whether data is inputted to each of the plurality of first buffer regions 430 and 440. The Sel signal may control a multiplexer (MUX) in the first reordering buffer 410 to provide one of the data stored in the plurality of first buffer regions 430 and 440 to the processor 200.

FIGS. 4B1, 4B2, 4B3, 4B4, 4B5, 4B6, 4B7, 4B8, 4B9, 4B10, and 4B11 are illustrations of an operation of the first reordering buffer 410 in each cycle according to an embodiment of the present disclosure.

Before the first cycle, in FIG. 4B1, the load control 450 may receive control information from the processor 200 and store data in the plurality of first buffer regions 430 and 440 based on the received control information. The plurality of first buffer regions 430 and 440 may store data in sequence according to the characteristic of the first FIFO memory 420.

In the first cycle, in FIG. 4B2, the load control 450 may load data 0 from the buffer region 430 based on the control information and may provide the data to the processor 200. In addition, since the buffer region 430 has no data stored therein in the same cycle, the load control 450 may activate the We signal regarding the buffer region 430. Accordingly, data 2 may be stored in the buffer region 430 in the second cycle, in FIG. 4B3.

In the third cycle, in FIG. 4B4, the load control 450 may load data 2 from the buffer region 430 based on the control information and may provide the data to the processor 200. In addition, since the buffer region 430 has no data stored therein in the same cycle, the load control 450 may activate the We signal regarding the buffer region 430. Accordingly, data 3 may be stored in the buffer region 430 in the fourth cycle, in FIG. 4B5.

In the fourth cycle, the load control 450 may load data 1 from the buffer region 440 based on the control information and may provide the data to the processor 200. In addition, since the buffer region 440 has no data stored therein in the same cycle, the load control 450 may activate the We signal regarding the buffer region 440. Accordingly, data 4 may be stored in the buffer region 440 in the fifth cycle, in FIG. 4B6.

In the above-described way, the load control 450 may provide data to the processor 200 in the order of data 0, data 2, data 1, data 4, data 3, data 6, data 5, and data 7, in FIGS. 4B2, 4B4, 4B5, 4B6, 4B7, 4B8, 4B9, and 4B11, respectively.

FIGS. 5A, 5B1, 5B2, 5B3, 5B4, 5B5, 5B6, 5B7, 5B8, 5B9, 5B10, 5B11, and 5B12 are illustrations of an operation of the first reordering buffer 410 according to an embodiment of the present disclosure. For example, the first reordering buffer 410 is operated according to the second schedule as shown in the right view of FIG. 3B. Since the configuration of the first reordering buffer 410 is the same as described in FIG. 4A, a redundant explanation is omitted.

Referring to FIGS. 5A, 5B1, 5B2, 5B3, 5B4, 5B5, 5B6, 5B7, 5B8, 5B9, 5B10, 5B11 and 5B12, the first reordering buffer 410 may be connected to the output side of the external unit 300 and the input side of the first FIFO memory 420, may store data outputted from the external unit 300 in the plurality of first buffer regions 430 and 440 in sequence, may output data stored in one of the plurality of first buffer regions 430 and 440 based on a control signal, and may provide the data to the first FIFO memory 420.

In this case, in response to a load command of the processor 200 being received, the first FIFO memory 420 may output the data stored therein in sequence and provide the data to the processor 200.

Herein, the control signal may be a signal which designates a buffer region in which data required to be outputted is stored from among the plurality of first buffer regions 430 and 440 based on the second schedule. The load control 450 may receive the control signal from the processor 200 before the first cycle. The load control 450 may receive the control signal earlier than in the case of FIGS. 4A, 4B1, 4B2, 4B3, 4B4, 4B5, 4B6, 4B7, 4B8, 4B9, 4B10, and 4B11.

FIGS. 5B1, 5B2, 5B3, 5B4, 5B5, 5B6, 5B7, 5B8, 5B9, 5B10, 5B11, and 5B12 are illustrations of the operation of the first reordering buffer 410 in each cycle according to an embodiment of the present disclosure.

The load control 450 may receive control information from the processor 200 before the first cycle, in FIGS. 5B1 and 5B2. In response to data not being stored in the plurality of first buffer regions 430 and 440, the plurality of first buffer regions 430 and 440 may receive data from the external unit 300 and store the data. The load control 450 may load data 0 from the buffer region 430 based on the control information, and may provide the data to the first FIFO memory 420.

In addition, since the buffer region 430 has no data stored therein in the same cycle, the load control 450 may activate the We signal regarding the buffer region 430. Accordingly, data 2 may be stored in the buffer region 430 in the first cycle, in FIG. 5B3.

In the above-described way, the load control 450 may provide data to the first FIFO memory 420 in the order of data 0, data 2, data 1, data 4, data 3, data 6, data 5, and data 7.

The first FIFO memory 420 may store data in the order of data 0, data 2, data 1, data 4, data 3, data 6, data 5, and data 7, and output the first stored data first. That is, the first FIFO memory 420 may provide the data to the processor 200 in the order of data 0, data 2, data 1, data 4, data 3, data 6, data 5, and data 7.

The processor 200 may transmit a load command to the first FIFO memory 420 after predetermined data is stored in the first FIFO memory 420, and may receive the data. In the example shown in the right view of FIG. 3B, data 0 is data which is required first, and the processor 200 may transmit a load command to the FIFO memory 420 after data 0 is stored in the first FIFO memory 420.

FIG. 6 is an illustration of a schedule according to an embodiment of the present disclosure.

Referring to FIG. 6, dii_load is changed to dii_store in the right view of FIG. 3B, and a detailed description is omitted.

FIGS. 7A, 7B1, 7B2, 7B3, 7B4, 7B5, 7B6, 7B7, 7B8, 7B9, 7B10, 7B11, and 7B12 are views to illustrate an operation of a second reordering buffer 710 according to an embodiment of the present disclosure. For example, the second reordering buffer 710 is operated according to the second schedule as shown in FIG. 6.

Referring to FIGS. 7A, 7B1, 7B2, 7B3, 7B4, 7B5, 7B6, 7B7, 7B8, 7B9, 7B10, 7B11, and 7B12, a second FIFO memory 720 may store data outputted from the processor 220 in sequence, and may output the stored data in sequence and provide the data to the second reordering buffer 710.

The second reordering buffer 710 may be connected to the output side of the second FIFO memory 720 and the input side of the external unit 300, and may store data outputted from the second FIFO memory 720 in sequence in a plurality of second buffer regions 730 and 740 in sequence, and may output data stored in one of the plurality of second buffer regions 730 and 740 based on a control signal and provide the data to the external unit 300.

Herein, the control signal may be a signal which designates a buffer region in which data required to be outputted is stored from among the plurality of second buffer regions 730 and 740 based on the second schedule.

The second reordering buffer 710 may include a store control 750. The store control 750 may receive, from the processor 200, DII setting information regarding the number of dii_store commands to be processed in the prolog of the second schedule and a processing order thereof, the number of dii_store commands to be processed in one iteration of the kernel and a processing order thereof, and the number of dii_store commands to be processed in the epilog and a processing order thereof. That is, the store control 750 may receive DII setting information from the processor 200. In the following description, the DII setting information will be referred to as a control signal.

The store control 750 may generate a We signal and a Sel signal and control the other configurations in the second reordering buffer 710. The We signal is a signal indicating whether data is inputted to each of the plurality of second buffer regions 730 and 740. The Sel signal may control a MUX in the second reordering buffer 710 to provide one of the data stored in the plurality of second buffer regions 730 and 740 to the external unit 300.

FIGS. 7B1, 7B2, 7B3, 7B4, 7B5, 7B6, 7B7, 7B8, 7B9, 7B10, 7B11, and 7B12 are illustrations of the operation of the second reordering buffer 710 in each cycle according to an embodiment of the present disclosure.

The second FIFO memory 720 may receive data 0 from the processor 200 in the first cycle, in FIG. 7B1, and may store the data 0 in the second cycle, in FIG. 7B2.

In order to store the data 0 in the buffer region 730 of the second reordering buffer 710 in the second cycle, the We signal indicating the buffer region 730 may be activated.

The second FIFO memory 720 may receive data 2 from the processor 200 in the third cycle, in FIG. 7B3, and may store the data 2 in the fourth cycle, in FIG. 7B4. The data 0 stored in the buffer region 730 may be outputted to the external unit 300.

The second FIFO memory 720 may receive data 1 from the processor 200 in the fourth cycle, and may store the data 1 in the fifth cycle, in FIG. 7B5. In addition, in order to store the data 2 in the buffer region 730 of the second reordering buffer 710, the We signal indicating the buffer region 730 may be activated. However, since the data 1 should be outputted first, the data 2 may not be outputted after being stored in the buffer region 730.

The second FIFO memory 720 may receive data 4 from the processor 200 in the fifth cycle and store the data 4 in the sixth cycle, in FIG. 7B6. In addition, the data 1 may be provided to the buffer region 740 of the second reordering buffer 710 and may be stored in the next cycle.

The second FIFO memory 720 may receive data 3 from the processor 200 in the sixth cycle and store the data 3 in the seventh cycle, in FIG. 7B7. The data 1 stored in the buffer region 740 may be outputted to the external unit 300, and, in order to store data 4 in the buffer region 740, the We signal indicating the buffer region 740 may be activated.

In the above-described way, the store control 750 may provide the data to the external unit 300 in the order of data 0, data 1, data 2, data 3, data 4, data 5, data 6, and data 7.

FIGS. 8A, 8B1, 8B2, 8B3, 8B4, 8B5, 8B6, 8B7, 8B8, 8B9, 8B10, 8B11, and 8B12 are illustrations of an operation of the second reordering buffer 710 according to an embodiment of the present disclosure. For example, the second reordering buffer 710 is operated according to the second schedule as shown in FIG. 6. Since the configuration of the second reordering buffer 710 is the same as described in FIG. 7A, a redundant explanation is omitted.

Referring to FIGS. 8A, 8B1, 8B2, 8B3, 8B4, 8B5, 8B6, 8B7, 8B8, 8B9, 8B10, 8B11, and 8B12, the second reordering buffer 710 may be connected to the output side of the processor 200 and the input side of the second FIFO memory 720, and may store data outputted from the processor 200 in the plurality of second buffer regions 730 and 740 in sequence and may output data stored in one of the plurality of second buffer regions 730 and 740 based on a control signal and provide the data to the second FIFO memory 720.

Herein, the control signal may be a signal which designates a buffer region in which data required to be outputted is stored from among the plurality of second buffer regions 730 and 740 based on the second schedule.

FIGS. 8B1, 8B2, 8B3, 8B4, 8B5, 8B6, 8B7, 8B8, 8B9, 8B10, 8B11, and 8B12 are illustrations of the operation of the second reordering buffer 710 in each cycle according to an embodiment of the present disclosure.

The second reordering buffer 710 may receive data 0 from the processor 200 in the first cycle, in FIG. 8B1, and may store the data 0 in the buffer region 730 in the second cycle, in FIG. 8B2.

In the second cycle, the store control 750 may output the data 0 from the buffer region 730 based on control information, and provide the data 0 to the second FIFO memory 720.

The second reordering buffer 710 may receive data 2 from the processor 200 in the third cycle and store the data 2 in the buffer region 730 in the next cycle. The second FIFO memory 720 may output the data 0 to the external unit 300.

However, in order to display the order of data stored in the second FIFO memory 720, it is assumed that the data stored in the second FIFO memory 720 is not outputted to the external unit 300 after the third cycle in FIG. 8B3.

Since data 1 should be outputted first in the fourth cycle, in FIG. 8B4, the data 2 stored in the buffer region 730 may not be outputted. The second reordering buffer 710 may receive the data 1 from the processor 200 and store the data 1 in the buffer region 740 in the fifth cycle, in FIG. 8B5.

In the fifth cycle, the store control 750 may output the data 1 from the buffer region 740 based on control information, and provide the data 1 to the second FIFO memory 720. The second reordering buffer 710 may receive data 4 from the processor 200 and may activate the We signal indicating the buffer region 740 to store the data 4 in the buffer region 740.

In the sixth cycle, in FIG. 8B6, the store control 750 may output the data 2 from the buffer region 730 based on control information, and may provide the data 2 to the second FIFO memory 720. The second reordering buffer 710 may receive data 3 from the processor 200 and store the data 3 in the buffer region 730 in the seventh cycle, in FIG. 8B7.

In the above-described way, the store control 750 may provide data to the external unit 300 in the order of data 0, data 1, data 2, data 3, data 4, data 5, data 6, and data 7.

In FIGS. 8A, 8B1, 8B2, 8B3, 8B4, 8B5, 8B6, 8B7, 8B8, 8B9, 8B10, 8B11, and 8B12, in response to the plurality of second buffer regions 730 and 740 of the second reordering buffer 710 being empty, the second reordering buffer 710 may receive data from the processor 200 and store the data. In addition, in response to data having an order intended in a current cycle being stored in one of the plurality of second buffer regions 730 and 740, the store control 750 may select this data through the Sel signal and provide the data to the second FIFO memory 720.

Figure 9:
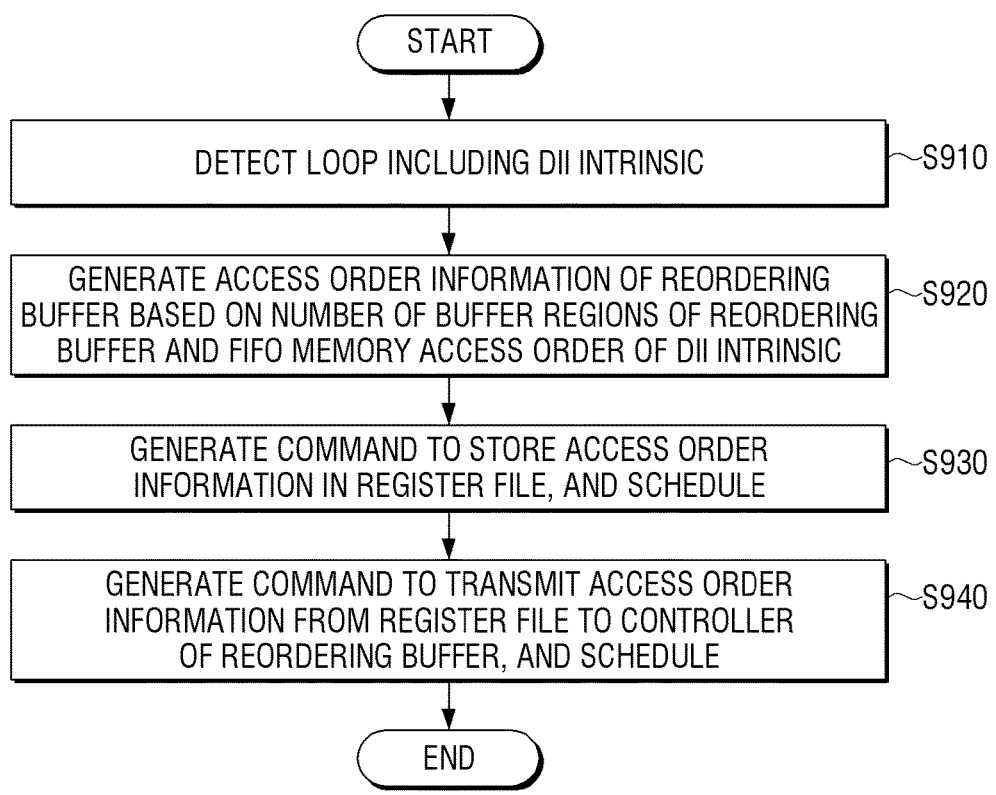

FIG. 9 is a flowchart of a method of generating a control signal according to an embodiment of the present disclosure.

Referring to FIG. 9, the external compiler may generate a control signal and provide the control signal to the processor 200. The external compiler detects a loop including DII intrinsic from a first schedule in step S910. Herein, DII Intrinsic is a command related to the data input/output unit 100 and includes dii_load, dii_store, or the like.

In addition, the external compiler may generate access order information of the reordering buffer 120 based on the number of buffer regions of the reordering buffer 120 and an order of DII Intrinsic in the loop accessing the FIFO memory in step S920.

In addition, the external compiler may generate a command to store the access order information in a register file and perform scheduling in step S930. Herein, the register file refers to a temporary storage in the processor 200.

In addition, the external compiler may generate a command to transmit the access order information from the register file to the controller of the reordering buffer 120, and perform scheduling in step S940.

The processor 200 may receive and store the information generated as described above, and, in response to an appropriate cycle, the processor 200 may transmit the control signal to the reordering buffer 120. Herein, the control signal may be a signal for controlling the output of the plurality of buffer regions of the reordering buffer 120 with respect to at least one loop. That is, the control signal may be a signal which is re-generated in the processor 200 based on the information received from the external compiler.

However, the present disclosure is not limited thereto. The information received from the external compiler may be used as is as the control signal. In this case, the processor 200 may temporarily store the information received from the external compiler and transmit the information to the reordering buffer 120.

Figure 10:
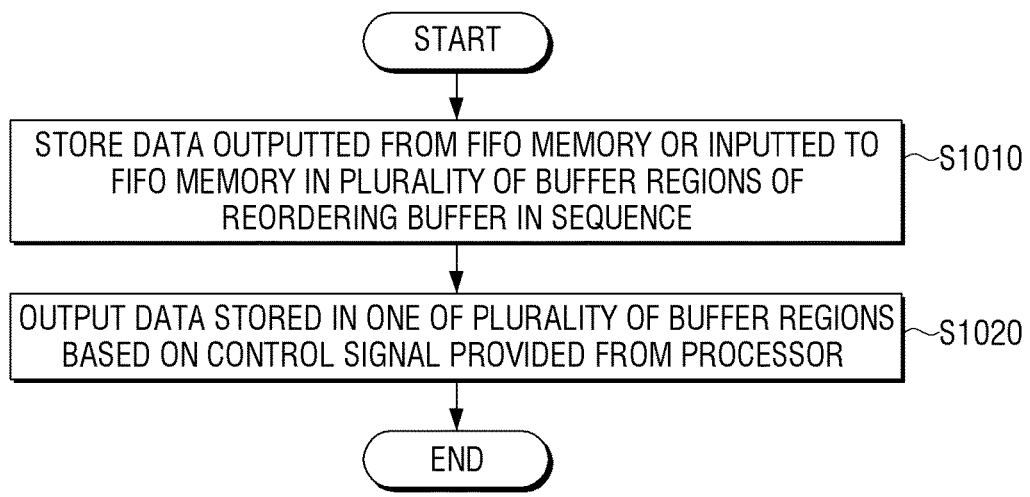

FIG. 10 is a flowchart of a control method of a data input/output unit according to an embodiment of the present disclosure.

Referring to FIG. 10, the data input/output unit may be connected to a processor which processes data based on a second schedule in which cycles of a kernel of a first schedule are reduced, and may receive and output data in sequence based on the first schedule. The data input/output unit may include a FIFO memory configured to store data inputted and outputted between an external unit and the processor in sequence, and a reordering buffer which is connected to one side of the FIFO memory.

The data input/output unit may store data which is outputted from the FIFO memory or inputted to the FIFO memory in a plurality of buffer regions of the reordering buffer in sequence in step S1010. In addition, the data input/output unit may output data stored in one of the plurality of buffer regions based on a control signal provided from the processor in step S1020.

The FIFO memory may include a first FIFO memory configured to provide data inputted from the external unit to the processor; and a second FIFO memory configured to provide data outputted from the processor to the external unit, wherein the reordering buffer may include a first reordering buffer connected to one side of the first FIFO memory; and a second reordering buffer connected to one side of the second FIFO memory.

In addition, the first reordering buffer may be connected to an output side of the first FIFO memory and an input side of the processor, and storing data outputted from, or inputted to, the FIFO memory in a plurality of buffer regions of the reordering buffer in sequence in step S1010 may include storing data outputted from the first FIFO memory in sequence in a plurality of first buffer regions in sequence, and outputting data stored in one of the plurality of buffer regions based on a control signal provided from the processor in step S1020 may include outputting data stored in one of the plurality of first buffer regions based on the control signal and providing the data to the processor.

Alternatively, the first reordering buffer may be connected to an output side of the external unit and an input side of the first FIFO memory. Storing data outputted from, or inputted to, the FIFO memory in a plurality of buffer regions of the reordering buffer in sequence in step S1010 may include storing data outputted from the external unit in a plurality of first buffer regions in sequence, and outputting data stored in one of the plurality of buffer regions based on a control signal provided from the processor in step S1020 may include outputting data stored in one of the plurality of first buffer regions based on the control signal and providing the data to the first FIFO memory, and, in response to a load command of the processor being received, outputting data stored in the first FIFO memory in sequence and providing the data to the processor.

The second reordering buffer may be connected to an output side of the second FIFO memory and an input side of the external unit. The control method may further include storing data outputted from the processor in the second FIFO memory in sequence, and outputting the stored data in sequence and providing the data to the second reordering buffer. Storing data outputted from, or inputted to, the FIFO memory in a plurality of buffer regions of the reordering buffer in sequence in step S1010 may include storing data outputted from the second FIFO memory in sequence in a plurality of second buffer regions in sequence, and outputting data stored in one of the plurality of buffer regions based on a control signal provided from the processor in step S1020 may include outputting data stored in one of the plurality of second buffer regions based on the control signal and providing the data to the external unit.

Alternatively, the second reordering buffer may be connected to an output side of the processor and an input side of the second FIFO memory. Storing data outputted from, or inputted to, the FIFO memory in a plurality of buffer regions of the reordering buffer in sequence in step S1010 may include storing data outputted from the processor in a plurality of second buffer regions in sequence, and outputting data stored in one of the plurality of buffer regions based on a control signal provided from the processor in step S1020 may include outputting data stored in one of the plurality of second buffer regions based on the control signal and providing the data to the second FIFO memory.

The control method may further include, in response to a load command of the processor being received in a state where the first FIFO memory is empty, or a store command of the processor being received in a state where there is no storage space in the second FIFO memory, transmitting a stall command to stall data processing of the processor to the processor.

The control signal may be a signal indicating a buffer region in which data required to be outputted is stored from among the plurality of buffer regions based on the second schedule.

The second schedule may be a schedule in which a data input/output order of input/output commands is changed by reducing the cycles of the kernel included in the first schedule based on a number of the plurality of buffer regions.

According to an embodiment of the present disclosure, a processing speed of commands generated by a schedule of a processor may be enhanced by changing an order of data inputted to the processor at the data input/output unit.

In an embodiment of the present disclosure, the data input/output unit and the processor are distinguished, and the data input/output unit has been mainly described. However, the present disclosure is not limited thereto. For example, the data input/output unit and the processor may be implemented as one electronic apparatus.

In an embodiment of the present disclosure, each of the first reordering buffer and the second reordering buffer includes two buffer regions. However, the present disclosure is not limited thereto. For example, each of the first reordering buffer and the second reordering buffer may include three buffer regions. In addition, the first reordering buffer and the second reordering buffer may include different numbers of buffer regions.

In this case, the external compiler may generate the second schedule based on the first schedule in consideration of the number of the plurality of buffer regions. Alternatively, the external compiler may generate the second schedule from a program written in a high-level language in consideration of the number of the plurality of buffer regions.

A method according to an embodiment of the present disclosure may be programmed and stored in various storage media. Accordingly, a method may be implemented in various types of electronic apparatuses executing storage media.

For example, a non-transitory computer readable recording medium which stores a program performing the above-described control method in sequence may be provided.

The non-transitory computer readable recording medium refers to a medium that stores data semi-permanently rather than storing data for a very short time, such as a register, a cache, a memory or etc., and is readable by an apparatus. For example, the above-described applications or programs may be stored in the non-transitory computer readable recording medium such as a compact disc (CD), a digital versatile disk (DVD), a hard disk, a Blu-ray disk, a universal serial bus (USB), a memory card, a read only memory (ROM) etc. An embodiment of the present disclosure provides a data input/output unit which may enhance a data transmission and reception speed by inputting and outputting data using a FIFO memory, an electronic apparatus, and control methods thereof.

Another embodiment of the present disclosure provides a FIFO memory that may include a first FIFO memory configured to provide data inputted from an external unit to a processor; and a second FIFO memory configured to provide data outputted from the processor to the external unit, and a reordering buffer may include a first reordering buffer connected to one side of the first FIFO memory; and a second reordering buffer connected to one side of the second FIFO memory.

Another embodiment of the present disclosure provides a first reordering buffer that may be connected to an output side of a first FIFO memory and an input side of a processor, and may be configured to store data outputted from the first FIFO memory in sequence in a plurality of first buffer regions in sequence, and output data stored in one of the plurality of first buffer regions based on a control signal and provide the data to the processor.

Another embodiment of the present disclosure provides a first reordering buffer that may be connected to an output side of an external unit and an input side of a first FIFO memory, and may be configured to store data outputted from the external unit in a plurality of first buffer regions in sequence, and output data stored in one of the plurality of first buffer regions based on a control signal and provide the data to the first FIFO memory, and, in response to a load command of a processor being received, the first FIFO memory may be configured to output data stored in the first FIFO memory in sequence and provide the data to the processor.

Another embodiment of the present disclosure provides a second FIFO memory that may be configured to store data outputted from a processor in sequence, and to output the stored data in sequence and provide the data to a second reordering buffer, where the second reordering buffer may be connected to an output side of a second FIFO memory and an input side of an external unit, and may be configured to store data outputted from the second FIFO memory in sequence in a plurality of second buffer regions in sequence, and to output data stored in one of the plurality of second buffer regions based on a control signal and provide the data to the external unit.

Another embodiment of the present disclosure provides a second reordering buffer that may be connected to an output side of a processor and an input side of a second FIFO memory, and may be configured to store data outputted from the processor in a plurality of second buffer regions in sequence, and to output data stored in one of the plurality of second buffer regions based on a control signal and provide the data to the second FIFO memory.

Another embodiment of the present disclosure provides, in response to a load command of a processor being received in a state where a first FIFO memory is empty, or a store command of the processor being received in a state where there is no storage space in a second FIFO memory, a data input/output unit that may be configured to transmit a stall command to stall data processing of the processor to the processor.

Another embodiment of the present disclosure provides a control signal that may be a signal indicating a buffer region in which data required to be outputted is stored from among a plurality of buffer regions based on a second schedule.

Another embodiment of the present disclosure provides a second schedule that may be a schedule in which a data input/output order of input/output commands is changed by reducing cycles of a kernel included in a first schedule based on a number of a plurality of buffer regions.

Another embodiment of the present disclosure provides a FIFO memory that may include a first FIFO memory configured to provide data inputted from an external unit to a processor; and a second FIFO memory configured to provide data outputted from the processor to an external unit, and a reordering buffer that may include a first reordering buffer connected to one side of the first FIFO memory; and a second reordering buffer connected to one side of the second FIFO memory.

Another embodiment of the present disclosure provides a first reordering buffer that may be connected to an output side of a first FIFO memory and an input side of a processor, wherein storing data may include storing data outputted from the first FIFO memory in sequence in a plurality of first buffer regions in sequence, and wherein outputting data may include outputting data stored in one of the plurality of first buffer regions based on a control signal and providing the data to the processor.

Another embodiment of the present disclosure provides a first reordering buffer that may be connected to an output side of an external unit and an input side of a first FIFO memory, wherein storing data may include storing data outputted from the external unit in a plurality of first buffer regions in sequence, and wherein outputting data may include outputting data stored in one of the plurality of first buffer regions based on a control signal and providing the data to the first FIFO memory, and, in response to a load command of a processor being received, outputting data stored in the first FIFO memory in sequence and providing the data to the processor.

Another embodiment of the present disclosure provides a second reordering buffer that may be connected to an output side of a second FIFO memory and an input side of an external unit, wherein a control method may further include storing data outputted from a processor in the second FIFO memory in sequence, and outputting the stored data in sequence and providing the data to the second reordering buffer, wherein storing data may include storing data outputted from the second FIFO memory in sequence in a plurality of second buffer regions in sequence, and wherein outputting data may include outputting data stored in one of the plurality of second buffer regions based on a control signal and providing the data to the external unit.

Another embodiment of the present disclosure provides a second reordering buffer that may be connected to an output side of a processor and an input side of a second FIFO memory, wherein storing data may include storing data outputted from the processor in a plurality of second buffer regions in sequence, and wherein outputting data may include outputting data stored in one of the plurality of second buffer regions based on a control signal and providing the data to the second FIFO memory.

Another embodiment of the present disclosure provides a control method that may further include, in response to a load command of a processor being received in a state where a first FIFO memory is empty, or a store command of the processor being received in a state where there is no storage space in a second FIFO memory, transmitting a stall command to stall data processing of the processor to the processor.

Another embodiment of the present disclosure provides a control signal that may be a signal indicating a buffer region in which data required to be outputted is stored from among a plurality of buffer regions based on a second schedule.

Another embodiment of the present disclosure provides a second schedule that may be a schedule in which a data input/output order of input/output commands is changed by reducing cycles of a kernel included in first schedule based on a number of a plurality of buffer regions.

Another embodiment of the present disclosure provides that a schedule processing speed of a processor may be enhanced by changing an order of data inputted to a processor at a data input/output unit.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A data input/output unit connected to a processor, and receives and outputs data in sequence based on a first schedule, the data input/output unit comprising:
   a first-input-first-output (FIFO) memory connected to an external unit and the processor; and
   a reordering buffer connected to one side of the FIFO memory, and stores data outputted from, or inputted to, the FIFO memory in a plurality of buffer regions in sequence based on the first schedule, and outputs data stored in one of the plurality of buffer regions based on a control signal provided from the processor, corresponding to a second schedule in which cycles of a kernel of the first schedule are reduced,
   wherein the control signal indicates a buffer region in which data to be output is stored from among the plurality of buffer regions.

2. The data input/output unit of claim 1, wherein the FIFO memory comprises:
   a first FIFO memory; and
   a second FIFO memory, and
   wherein the reordering buffer comprises:
   a first reordering buffer which is connected to one side of the first FIFO memory; and
   a second reordering buffer which is connected to one side of the second FIFO memory.

3. The data input/output unit of claim 2, wherein the first reordering buffer comprises:
   a plurality of first buffer regions, each of the plurality of first buffer regions being connected to an output side of the external unit and an input side of the first FIFO memory; and
   a load controller configured to store data outputted from the first FIFO memory in sequence in the plurality of first buffer regions in sequence, and to output data stored in one of the plurality of first buffer regions in response to the control signal and provide the data to the processor.

4. The data input/output unit of claim 2, wherein the first reordering buffer comprises:
   a plurality of first buffer regions, each of the plurality of first buffer regions connected to an output side of the external unit and an input side of the first FIFO memory; and
   a load controller configured to store data outputted from the external unit in the plurality of first buffer regions in sequence, and to output data stored in one of the plurality of first buffer regions based on the control signal and provide the data to the first FIFO memory, and
   wherein the first FIFO memory is configured to output, in response to receiving a load command from the processor, data stored in the first FIFO memory in sequence and provide the data to the processor.

5. The data input/output unit of claim 2, wherein the second FIFO memory is configured to store data outputted from the processor in sequence, and to output the stored data in sequence and provide the stored data to the second reordering buffer, and
   wherein the second reordering buffer comprises:
   a plurality of second buffer regions, each of the plurality of second buffer regions connected to an output side of the second FIFO memory and an input side of the external unit; and
   a store controller configured to store data outputted from the second FIFO memory in sequence in the plurality of second buffer regions in sequence, and to output data stored in one of the plurality of second buffer regions based on the control signal and provide the data to the external unit.

6. The data input/output unit of claim 2, wherein the second reordering buffer comprises:
   a plurality of second buffer regions, each of the plurality of second buffer regions connected to an output side of the processor and an input side of the second FIFO memory; and
   a store controller configured to store data outputted from the processor in the plurality of second buffer regions in sequence, and to output data stored in one of the plurality of second buffer regions in response to the control signal and provide the data to the second FIFO memory.

7. The data input/output unit of claim 2, wherein the data input/output unit is configured to transmit, in response to receiving a load command from the processor in a state where the first FIFO memory is empty, or receiving a store command from the processor in a state where there is no storage space in the second FIFO memory, a stall command to the processor to stall data processing of the processor.

8. The data input/output unit of claim 1, wherein the processor processes data based on the second schedule.

9. The data input/output unit of claim 1, wherein the processor processes data based on a second schedule in which cycles of a kernel of the first schedule are reduced, and wherein the second schedule is a schedule in which a data input/output order of input/output commands is changed by reducing the cycles of the kernel included in the first schedule based on a number of the plurality of buffer regions.

10. An electronic apparatus, comprising:
a data input/output unit configured to receive and output data in sequence based on a first schedule; and
a processor configured to process data based on a second schedule in which cycles of a kernel of the first schedule are reduced,
wherein the data input/output unit comprises:
a first-input-first-output (FIFO) memory connected to an external unit and the processor; and
a reordering buffer connected to one side of the FIFO memory, and stores data outputted from, or inputted to, the FIFO memory in a plurality of buffer regions in sequence based on the first schedule, and outputs data stored in one of the plurality of buffer regions based on a control signal provided from the processor, corresponding to a second schedule in which cycles of a kernel of the first schedule are reduced, and
wherein the control signal indicates a buffer region in which data to be output is stored from among the plurality of buffer regions.

11. A method of controlling a data input/output unit, wherein the data input/output unit which is connected to a processor, and receives and outputs data in sequence based on a first schedule, wherein the data input/output unit comprises a first-input-first-output (FIFO) memory connected to an external unit and the processor, and a reordering buffer connected to one side of the FIFO memory, the method comprising:

storing data outputted from, or inputted to, the FIFO memory in a plurality of buffer regions of the reordering buffer in sequence based on the first schedule; and
outputting data stored in one of the plurality of buffer regions based on a control signal provided from the processor, corresponding to a second schedule in which cycles of a kernel of the first schedule are reduced,
wherein the control signal indicates a buffer region in which data to be output is stored from among the plurality of buffer regions.

12. The method of claim 11, wherein the FIFO memory comprises:
a first FIFO memory; and
a second FIFO memory, and
wherein the reordering buffer comprises:
a first reordering buffer which is connected to one side of the first FIFO memory; and
a second reordering buffer which is connected to one side of the second FIFO memory.

13. The method of claim 12, wherein the first reordering buffer comprises a plurality of first buffer regions, each of the plurality of first buffer regions being connected to an output side of the external unit and an input side of the first FIFO memory and a load controller, wherein storing data which is outputted from, or inputted to, the FIFO memory in the plurality of buffer regions of the reordering buffer in sequence comprises storing data outputted from the first FIFO memory in sequence in the plurality of first buffer regions in sequence, and
wherein outputting data stored in one of the plurality of buffer regions in response to the control signal provided from the processor comprises outputting data stored in one of the plurality of first buffer regions based on the control signal and providing the data to the processor.

14. The method of claim 12, wherein the first reordering buffer comprises a plurality of first buffer regions, each of the plurality of first buffer regions being connected to an output side of the external unit and an input side of the first FIFO memory and a load controller, wherein storing data which is outputted from, or inputted to, the FIFO memory in the plurality of buffer regions of the reordering buffer in sequence comprises storing data outputted from the external unit in the plurality of first buffer regions in sequence, and
wherein outputting data stored in one of the plurality of buffer regions in response to the control signal provided from the processor comprises outputting data stored in one of the plurality of first buffer regions in response to the control signal and providing the data to the first FIFO memory, and, in response to receiving a load command from the processor, outputting data stored in the first FIFO memory in sequence and providing the data to the processor.

15. The method of claim 12, wherein the second reordering buffer comprises a plurality of second buffer regions, each of the plurality of second buffer regions connected to an output side of the second FIFO memory and an input side of the external unit and a store controller, wherein the method further comprises storing data outputted from the processor in the second FIFO memory in sequence, and outputting the stored data in sequence and providing the stored data to the second reordering buffer,
wherein storing data which is outputted from, or inputted to, the FIFO memory in the plurality of buffer regions of the reordering buffer in sequence comprises storing data outputted from the second FIFO memory in sequence in the plurality of second buffer regions in sequence, and
wherein outputting data stored in one of the plurality of buffer regions in response to the control signal provided from the processor comprises outputting data stored in one of the plurality of second buffer regions in response to the control signal and providing the data to the external unit.

16. The method of claim 12, wherein the second reordering buffer comprises a plurality of second buffer regions, each of the plurality of second buffer regions connected to an output side of the processor and an input side of the second FIFO memory and a store controller, wherein storing data which is outputted from, or inputted to, the FIFO memory in the plurality of buffer regions of the reordering buffer in sequence comprises storing data outputted from the processor in the plurality of second buffer regions in sequence, and
wherein outputting data stored in one of the plurality of buffer regions in response to the control signal provided from the processor comprises outputting data stored in one of the plurality of second buffer regions in response to the control signal and providing the data to the second FIFO memory.

17. The method of claim 12, further comprising, in response to receiving a load command from the processor in a state where the first FIFO memory is empty, or receiving a store command from the processor in a state where there is no storage space in the second FIFO memory, transmitting a stall command to the processor to stall data processing of the processor.

18. The method of claim 11, wherein the processor processes data based on the second schedule.

19. The method of claim 11, wherein the processor processes data based on a second schedule in which cycles of a kernel of the first schedule are reduced, and
  wherein the second schedule is a schedule in which a data input/output order of input/output commands is changed by reducing the cycles of the kernel included in the first schedule based on a number of the plurality of buffer regions.

* * * * *